(12) United States Patent
Jack et al.

(10) Patent No.: US 8,894,321 B2
(45) Date of Patent: Nov. 25, 2014

(54) WARM MIX ASPHALT

(75) Inventors: Iain Jack, Cape Girardeau, MO (US); Willer de Oliveira, Stockton, CA (US)

(73) Assignee: Western Emulsions, Inc., Dana Point, CA (US)

( * ) Notice: Subject to any disclaimer, the term of this patent is extended or adjusted under 35 U.S.C. 154(b) by 0 days.

(21) Appl. No.: 13/810,314

(22) PCT Filed: Jul. 12, 2011

(86) PCT No.: PCT/US2011/043683
§ 371 (c)(1),
(2), (4) Date: Sep. 3, 2013

(87) PCT Pub. No.: WO2012/009339
PCT Pub. Date: Jan. 19, 2012

(65) Prior Publication Data
US 2013/0336720 A1    Dec. 19, 2013

Related U.S. Application Data

(60) Provisional application No. 61/364,591, filed on Jul. 15, 2010.

(51) Int. Cl.
| | |
|---|---|
| *E01C 21/00* | (2006.01) |
| *E01C 19/10* | (2006.01) |
| *C08L 95/00* | (2006.01) |
| *B28C 5/00* | (2006.01) |
| *E01C 7/18* | (2006.01) |

(52) U.S. Cl.
CPC ............. *B28C 5/003* (2013.01); *E01C 19/1068* (2013.01); *C08L 2555/50* (2013.01); *C08L 2555/24* (2013.01); *C08L 95/00* (2013.01); *E01C 19/10* (2013.01); *E01C 19/1031* (2013.01); *E01C 7/182* (2013.01); *C08L 2555/52* (2013.01); *E01C 21/00* (2013.01); *E01C 2019/1095* (2013.01); *E01C 19/1036* (2013.01)
USPC .............................................. 404/72; 404/17

(58) Field of Classification Search
CPC ....... B28C 5/003; E01C 11/005; E01C 7/182; E01C 19/10; E01C 19/1031; E01C 19/1036; E01C 19/1068; E01C 21/00; C08L 95/00; C08L 2555/24; C08L 2555/50; C08L 2555/52
USPC ........ 404/17–22, 75, 111, 118, 72; 106/281.1
See application file for complete search history.

(56) References Cited

U.S. PATENT DOCUMENTS

| | | | | |
|---|---|---|---|---|
| 5,512,093 | A | * | 4/1996 | Huege et al. ............. 106/284.03 |
| 5,542,977 | A | * | 8/1996 | Hanst ............................. 106/706 |
| 5,544,971 | A | * | 8/1996 | Huege et al. .................... 404/72 |
| 5,944,885 | A | * | 8/1999 | Yoshinaka et al. ......... 106/281.1 |

(Continued)

OTHER PUBLICATIONS

National Lime Association, , "How to Add Hydrated Lime to Asphalt, An Overview of Current Methods", http://www.lime.org/documents/publications/free_downloads/how-to-add-lime.pdf, Sep. 2003, 15 pages.

*Primary Examiner* — Raymond W Addie
(74) *Attorney, Agent, or Firm* — Dorsey & Whitney LLP (57) ABSTRACT

The disclosure is directed to a warm mix asphalt comprising a hydrated lime slurry additive, methods of producing the same, methods of producing an asphalt pavement and methods of paving a surface.

6 Claims, 5 Drawing Sheets

(56) References Cited

U.S. PATENT DOCUMENTS

| | | | |
|---|---|---|---|
| 6,024,788 A * | 2/2000 | Tomioka et al. | 106/281.1 |
| 6,027,558 A * | 2/2000 | Little et al. | 106/284.04 |
| 6,846,354 B2 * | 1/2005 | Larsen et al. | 106/122 |
| 7,303,623 B2 | 12/2007 | Bailey | |
| 2005/0076810 A1 * | 4/2005 | Barthel et al. | 106/282 |
| 2005/0284333 A1 * | 12/2005 | Falkiewicz | 106/284.04 |
| 2007/0231545 A1 * | 10/2007 | Ruan | 428/143 |
| 2009/0194002 A1 * | 8/2009 | Maldonado et al. | 106/281.1 |

* cited by examiner

Process Flow Chart – Continuous Drum Plant

Hot Mix Batch Plant Schematic

FIG. 5
Batch Plant – Lime Slurry Delivery (Close up)
Overhead Hot Aggregate Bins

WARM MIX ASPHALT

CROSS-REFERENCE TO RELATED APPLICATION

This application is a national stage application under 35 U.S.C. §371 of International Application No. PCT/US2011/043683, filed Jul. 12, 2011, entitled "Warm Mix Asphalt," which claims priority to U.S. Patent Application No. 61/364,591, filed Jul. 15, 2010, the contents of all of which are hereby incorporated in their entireties by reference.

FIELD

The present disclosure relates to a warm mix asphalt comprising a hydrated lime slurry additive, methods of producing the same, methods of producing an asphalt pavement and methods of paving a surface.

BACKGROUND

Hydrated lime is used in many asphalt mixes and is generally required by many states to improve properties of pavements made from hot mix asphalt. Hydrated lime can be also used as an anti-stripping agent. The asphalt industry has used different approaches to introduce hydrated lime to asphalt mix. For example, the following methods have been used: dry hydrated lime injected into drum mixer, dry hydrated lime added to aggregate in pug mill, dry hydrated lime added to moist aggregate with marination, and hydrated lime slurry added to aggregate with or without marination. See, National Lime Association, *How to Add Hydrated Lime to Asphalt, An Overview of Current Methods* (September 2003), page 2.

Hot mix asphalts (HMA) are a mix of aggregate heated to about 300° F. to 350° F. with a similarly heated asphalt based binder, which generally includes asphalt and or asphalt and polymer.

A lower temperature alternative to HMA is warm mix asphalt (WMA). However, WMA tend to be costly due to the use of additives including waxes, amines and surfactants.

The present disclosure has been developed as an approach to introduce hydrated lime into a warm mix asphalt, while minimizing costs to recycle lost hydrated lime particles and reduce costs to dry aggregate particles.

SUMMARY

In one aspect, the present disclosure is directed to a method of making a warm mix asphalt composition. An asphalt stream is added into a mixer. A hydrated lime slurry is added into the asphalt stream. The aggregate is added into the mixer. The asphalt, hydrated lime slurry and aggregate are mixed in the mixer to form a warm mix asphalt composition.

Plants and other aspects configured for performing the disclosed, methods, and variations thereof, are disclosed.

DETAILED DESCRIPTION

Reference is made in detail to certain embodiments of systems and methods. The disclosed embodiments are not intended to be limiting of the claims. To the contrary, the claims are intended to cover all alternatives, modifications, and equivalents.

The present disclosure is broadly directed to a warm mix asphalt (WMA) system and methods of making a WMA that include adding a hydrated lime slurry to warm mix asphalt. In certain aspects, the water in the system allows achievement of on-site compaction at reduced temperatures and the lime counteracts the ill effects of the water by strengthening the asphalt to bond to the aggregate.

Warm Mix Asphalt Systems

In various embodiments, factors in the manufacturing environment for asphalt mix production include (A) the asphalt content of the mix, (B) the addition of a hydrated lime slurry, (C) the optional additives, (D) the aggregate grade, and (E) the dry fillers.

A. Adding an Asphalt Stream into a Mixer

In some embodiments, a stream of asphalt can be pumped into a mixer.

Various asphalts (asphalt cements) can be included in the warm mix asphalt composition with the hydrated lime slurry additive. The choice of asphalt grade can depend on variables including the climatic conditions in the areas the asphalt mix is to be applied as well as the type and frequency of traffic which will be used on the road surface the asphalt mix is to be applied on.

Asphalt (asphalt cement) includes material in which the predominating constituents are bitumens, which occur in nature or are obtained in petroleum processing. Bitumens include solid, semisolid, or viscous substances, natural or manufactured, composed principally of high molecular weight hydrocarbons.

Asphalt binders can be included in the warm mix asphalt composition with the hydrated lime slurry additive. In various embodiments, asphalt describes asphalt cement that is classified according to the Standard Specification for Performance Graded Asphalt Binder, AASHTO Designation MP1. Asphalts which meet this standard with designations including PG-46, PG-52, PG-58, PG-64, PG-70, PG-76 and PG-82 can be included in the warm asphalt mix composition with the hydrated lime slurry additive. See American Association of State Highway and Transportation Officials, AASHTO MP1 Standard Specification for Performance Graded Asphalt Binder, January 2008.

Asphalt emulsions can be included in the warm asphalt mix composition with the hydrated lime slurry additive. In various embodiments, asphalt emulsions are an emulsion of asphalt and water that contains a small amount of an emulsifying agent. Emulsified asphalt droplets can be anionic (negative charge), cationic (positive charge) or nonionic (neutral).

In some embodiments, polymer modified asphalts can be included in the warm mix asphalt composition with the hydrated lime slurry additive. Polymer-modified asphalts include conventional asphalt cements, to which one or more polymer compounds have been added to improve resistance to deformation at high pavement temperatures and/or cracking resistance at low temperatures. In various embodiments, the asphalt can be any type known in the art, including polymer modified asphalt and tire rubber modified asphalt.

Polymer or rubber modified asphalts, including asphalt binders based on styrene-butadiene-styrene, styrene butadiene rubber, neoprene latex and natural rubber are described in U.S. Pat. No. 5,180,428, incorporated herein by reference. In various embodiments, warm mix asphalt can use any type of polymer modification system.

In various embodiments, the asphalt amount of the WMA is greater than 2% wt., 3% wt., 4% wt., 5% wt., 6% wt., 7% wt., 8% wt., 9% wt., 10% wt., and/or less than 10% wt., 9% wt., 8% wt., 7% wt., 6% wt., 5% wt., 4% wt., 3% wt., or 2% wt.

B. Adding a Hydrated Lime Slurry into the Asphalt Stream

The lime/water slurry (hydrated lime slurry) is injected into the asphalt stream as it goes into the continuous process plant or batch plant. In various embodiments: the lime slurry is incorporated into the asphalt stream. Adding the hydrated lime slurry can allow reduction of manufacturing temperatures at a HMA plant while providing an asphalt mix that still meets density specifications. The hydrated lime slurry additive aids in reducing viscosity of the asphalt mix. In various embodiments, the viscosity of the asphalt mix can be reduced temporarily during the initial aggregate/asphalt mix stage during production so that aggregate coating occurs at a lower temperature than a hot mix asphalt. The lime acts as an anti-stripping agent to counteract the ill effects of water for asphalt binding to the aggregate.

In various embodiments, the lime is hydrated lime. In some embodiments, hydrated lime is also known as slaked lime or $Ca(OH)_2$, calcium hydroxide. In some embodiments, hydrated lime is obtained when calcium oxide (CaO) (called lime or quicklime) is mixed with water. Quicklime can include high calcium quicklime, magnesium quicklime and dolomitic quicklime forms. In certain aspects, hydrated lime is a dry powder manufactured by treating quicklime with sufficient water to satisfy its chemical affinity for water, thereby converting the oxides to hydroxides.

In some aspects, the hydrated lime is in the form of a lime/water slurry.

The mixture can be prepared from lime and water. In various embodiments, the hydrated lime amount is greater than 15% wt., 20% wt., 25% wt., 30% wt., 35% wt., 40% wt., and/or less than 40% wt., 35% wt., 30% wt., 25% wt., 20% wt. or 15% wt.

The hydrated lime is dispersed in the water with a mixer. Optionally, a colloid or suspension agent could be added to the mixture. In various embodiments, dry lime can be used instead of hydrated lime.

In various embodiments, the amount of hydrated lime slurry added to the WMA is about 5% wt. of hydrated lime slurry of total weight of asphalt (cement).

Various quantities of lime can be used. In various embodiments, the w/w percent of lime can be greater than 0.1%, greater than 0.2%, greater than 0.3%, greater than 0.4%, greater than 0.5%, greater than 0.6%, greater than 0.7%, greater than 0.8%, greater than 0.9%, greater than 1%, greater than 2%, greater than 3%, greater than 4%, greater than 5%, greater than 6%, or greater than 7%. In various other embodiments, the w/w percent of lime can be less than 8%, less than 7%, less than 6%, less than 5%, or less than 4%, less than 3%, less than 2%, less than 1%, less than 0.9%, less than 0.8%, less than 0.7%, less than 0.6%, less than 0.5%, less than 0.4%, less than 0.3%, or less than 0.2%.

In one aspect, the amount of hydrated lime is 0.9% wt. of the total mix.

C. Optional Additives

Other additives can be included in the warm asphalt mix composition with the hydrated lime slurry additive, including surfactants.

D. Adding Aggregate into the Mixer

In various embodiments, industrial grade aggregates used in the production of asphalt pavement are suitable for the warm mix asphalt composition with the hydrated lime slurry additive.

In various aspects, aggregate can include hard, inert mineral material, such as gravel, crushed rock, slag or crushed stone. Aggregates can be selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project.

In various embodiments, aggregate gradation can refer to the percent of aggregate particles of a given size. For many load-bearing asphalt pavements, dense-graded, course-graded, open-graded and gap-graded gradations are common. Optionally, mixtures of various aggregate grades are used.

In some aspects, dense graded aggregate is an aggregate that has a particle size distribution such that when it is compacted, the resulting voids between the aggregate particles, expressed as a percentage of the total space occupied by the material, are less than about 10%. In certain aspects, course-graded aggregate is an aggregate having a continuous grading in sizes of particles from coarse through fine with a predominance of coarse sizes. In some aspects, open-graded aggregate include a large-sized stone with low levels of fines or filler. Gap-graded aggregate fall between dense-graded and open-graded classes. In certain aspects, well-graded aggregate is aggregate graded with relatively uniform proportions, from the maximum size down to filler.

The aggregate optionally includes sand. In various embodiments, sand is fine aggregate resulting from natural disintegration and abrasion or processing of rock. Sand can also be used as an additional dry filler in the asphalt mix.

The numbers of aggregate gradations which are in use vary significantly in each state and in each area of the world.

In various embodiments, the aggregate amount in the asphalt mix composition is greater than 90% wt., 91% wt., 92% wt., 93% wt., 94% wt., 95% wt., 96% wt., 97% wt., 98% wt., and/or less than 98% wt., 97% wt., 96% wt., 95% wt., 94% wt., 93% wt., 92% wt., 91% wt., or 90% wt.

Aggregate which is not fully dried can optionally be used in the present invention.

E. Dry Fillers

Dry fillers can be included in the warm asphalt mix composition with the hydrated lime slurry additive.

Filler can include mineral material of less than 0.075 mm in diameter. Filler is fines material generally less than P200. Dry fillers include bag house fines, additional fine material but this is included in the aggregate bins or injected in dry form into the mixing drums.

Asphalt Production Plants

In various embodiments, the present disclosure is broadly directed to asphalt production plants.

Conventional HMA production plants can be modified to produce warm mix asphalt with the hydrated lime slurry additive.

Hot mix asphalt (HMA) production plants can be continuous process plants and can be batch process plants. Typical temperatures of plant mixing for HMA production are about 300° F. to 350° F. Plant mix production temperatures drop to about 200° F. to 275° F. by using the hydrated lime slurry additive.

A. Mixer in Continuous Process Plant

In a continuous process plant or drum mix plant, raw aggregate or dried lime-coated aggregate can be brought up from ground hoppers at a precisely controlled rate and fed into a heater drum.

In various embodiments, the aggregate lacks a dried lime coating, because the lime is supplied to the asphalt mix as the hydrated lime slurry additive. Optionally, lime coated aggregate can be included. The lime amount on the aggregate can be considered in the calculation of total % weight of lime in the asphalt mixture. In various embodiments, a lime-coated aggregate can be used in combination with the lime slurry additive.

Lime coated aggregate can be produced by spraying a lime slurry over an aggregate stockpile to introduce hydrated lime as an adhesion agent and the water can be dried from the aggregate. The lime coated aggregate can be dried before it is combined with asphalt in the drum mixer. See U.S. Pat. No. 5,512,093 to Huege et al. Extra water provided by this process can increase energy costs because the aggregate must be dried before mixing it with the asphalt. Omitting the process step of coating the aggregate with hydrated lime slurry can lower energy costs associated with drying the aggregate before use.

Instead of coating aggregate with lime slurry, dry lime pellets including an asphalt compatible binder and lime fines have been used to add lime to an asphalt mix. See U.S. Pat. No. 7,303,623 to Bailey.

Once heated, the aggregate can be coated in the same drum with the asphalt binder from spray-bars situated behind the burner or in a smaller drum situated behind the heater drum. Finished asphalt mix product can be discharged into a hot store rather than directly into delivery vehicles.

Changing the asphalt mix can be achieved by varying the feed rates of the aggregate, filler and asphalt binder feeders, with time delays so that the change of blend occurs at the same point in the coating drum. Sand tends to move more slowly through the heating drum, so the blend proportions will not necessarily change at the same point on the feed conveyor. A small amount of material can be diverted to a waste chute when the transition point reaches the hot elevator.

In a continuous plant the aggregate can be heated to a temperature of >300° F. in a heated drum and the asphalt is introduced towards the end of the drum. The aggregate can be mixed with the asphalt in the rotating drum and the asphalt mix material can be discharged at the end of the drum and sent to overhead silos for storage. Trucks can be loaded under the silos to transport the warm mix asphalt material to a worksite.

Continuous process plants or drum mix plants can be less suitable for short production runs; although with sophisticated controls the change of mix can be accurate to within some seconds. Production rates of hundreds of tons per hour may equate to a ton about every ten seconds.

Continuous plants can be used for high capacity production but make one product at a time as the aggregate gradations are programmed into aggregate feed bins and this mix is fed into the heating drum, it takes at least about 30 minutes to switch over to another type of asphalt mix after the bin proportions are reprogrammed to supply a different aggregate blend to the heating drum.

Figure 2:
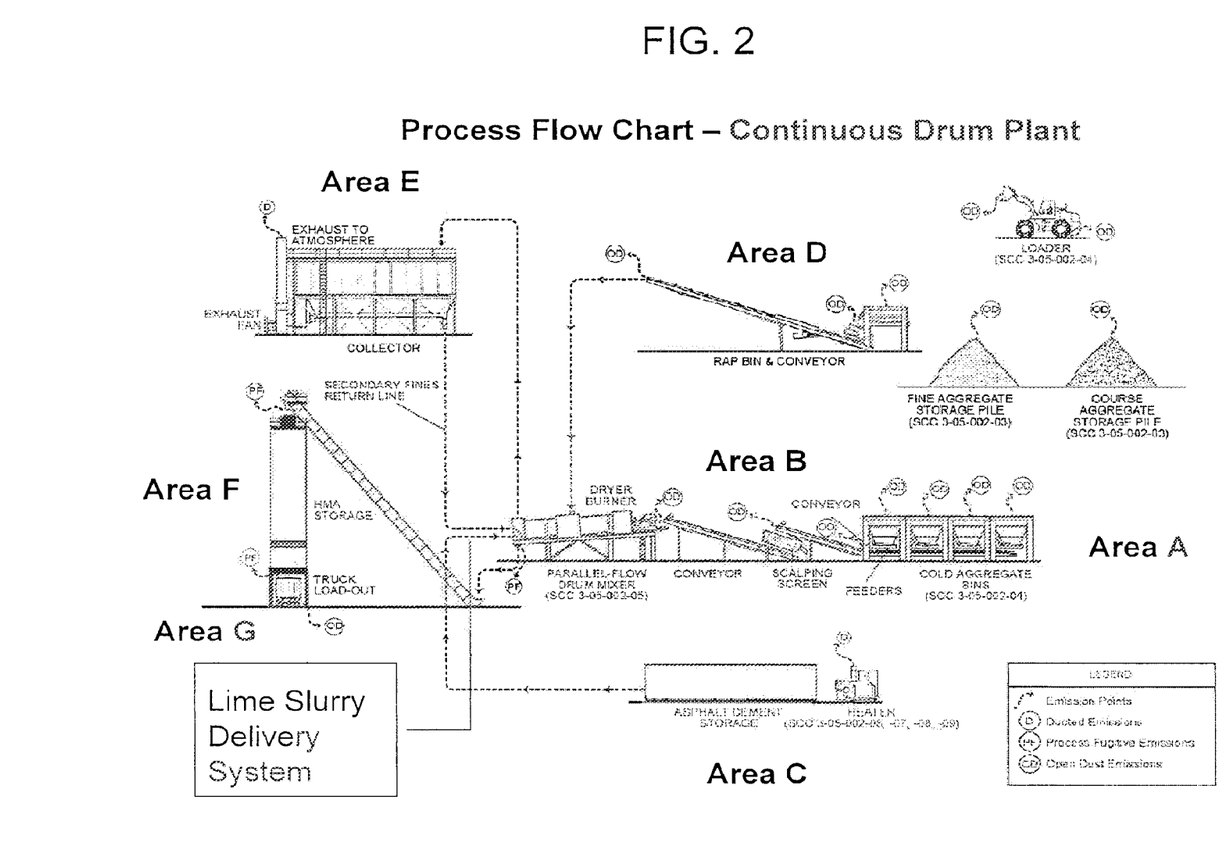
FIG. 2 shows a schematic of a continuous asphalt mix production plant.

FIG. 2 depicts addition of a hydrated lime slurry asphalt additive to a continuous drum plant. Area A is the aggregate bin storage area, each bin has a specific size aggregate stored in it. The conveyor belts below the bins are on load cells and the feeders from these bins are opened or closed to provide the exact mix of aggregate sizes required for each asphalt mix material produced.

Area B is where the blended aggregate enters the mixing drum. A parallel-flow drum mixer is shown in FIG. 2. There is a dryer burner on the drum which heats up the aggregate as it travels through the drum to temperatures in excess of 300° F. In various embodiments, the temperature can be from 220° F. to 300° F., in some cases 240° F. to 280° F. As it passes through the drum, moisture is driven off the aggregate surface before asphalt is introduced and coats the aggregate at the end of the drum.

Area C is the asphalt storage area and heated asphalt material is pumped from here into the end of the heating drum, forming an asphalt stream, where it mixes with hot aggregate.

In Area D, reclaimed asphalt pavement (RAP) is optionally introduced to the asphalt mix. RAP is pulverized excavated asphalt that is used as an aggregate in the recycling of asphalt pavements. Optionally, factory-rejected roofing shingles can also be added to RAP.

RAP is generally introduced halfway down the heating drum. In various embodiments, such as certain continuous plants, the mixing drum and the heating drum are the same unit. In various other embodiments, such as certain batch plants, the mixing drum and the heating drum are two separate pieces of equipment. Not all asphalt mixes contain RAP.

Area E includes a particulate matter collector. The burner in the heating drum produces hurricane force winds in the heating drum. This force can blow fine material out of the heating drum along with hot air. This fine material is collected in a filter house before the hot air is vented. This prevents particulate matter from being blown into the atmosphere.

Area F is the storage silo where the asphalt mix material is stored while waiting for trucks to arrive and take the material to the worksite.

Area G is the loading area for filling trucks before transportation to the worksite.

Figure 3:
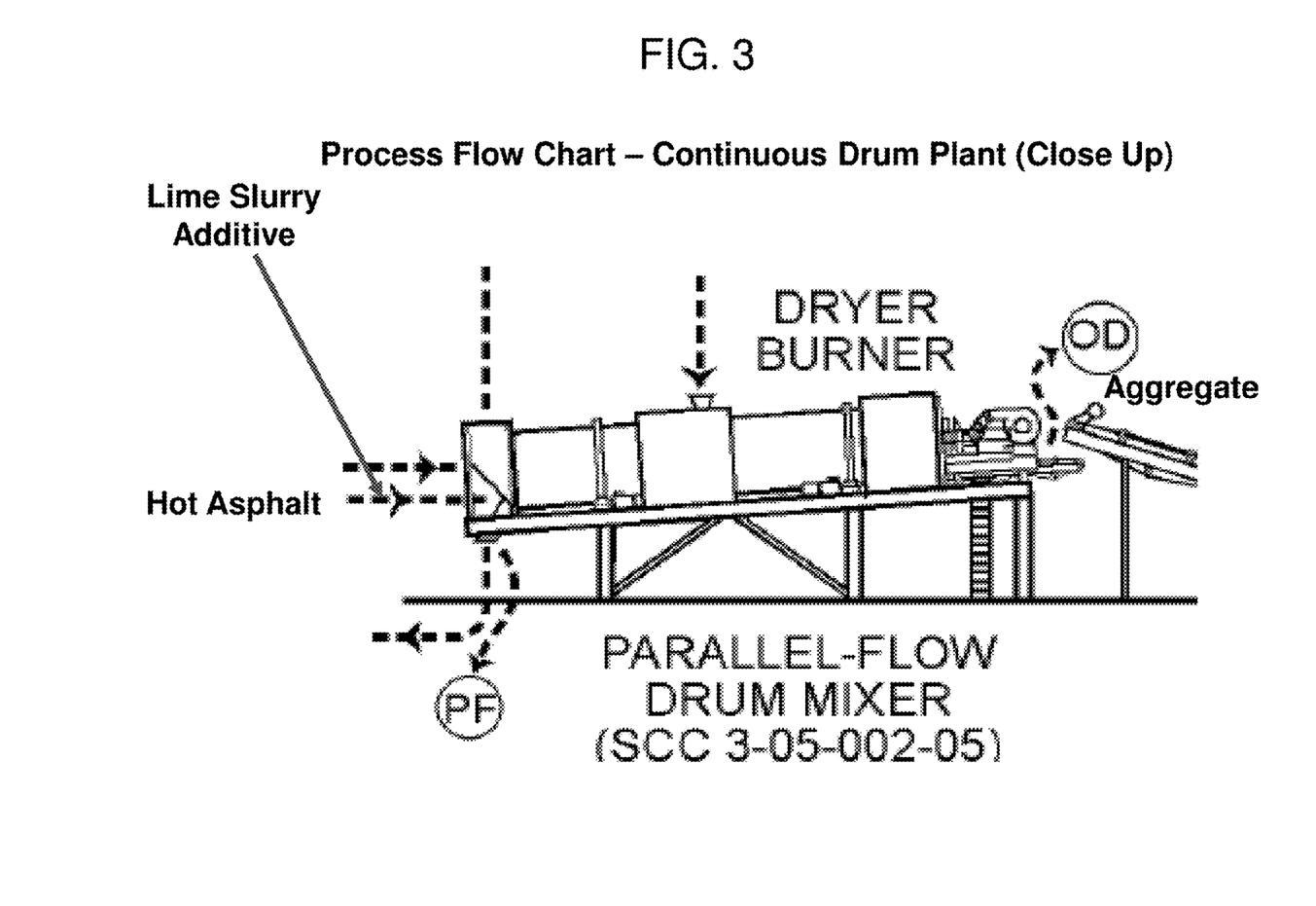
FIG. 3 shows an injection point of the hydrated lime slurry asphalt additive in a continuous plant operation.

FIG. 3 depicts a close-up view of the process flow chart of FIG. 2, featuring the drum mixer, the hydrated lime slurry asphalt additive is injected into the asphalt line, which in turn is pumped into the hot aggregate stream which is flowing towards the bottom end of the drum and discharged.

In some embodiments, in a continuous drum plant operation, the hydrated lime slurry asphalt additive is injected into the asphalt line at a rate of 5% by weight of asphalt. In certain aspects, the injection point is between about 12" and 15' before the asphalt supply line enters the drum mixer—at this point the lime slurry/asphalt mix will blend with the heated aggregate which is introduced at the other side of the mixing drum.

B. Mixer in Batch Process Plant

A second type of production plant can be a mixer in a batch operation. The aggregate, including raw aggregate or dried lime-coated aggregate, can be heated in the drum to temperature and can be transported to overhead storage bins after passing over a series of screens to split the aggregate into different size fractions. This heated aggregate in the overhead bins can be released to a pugmill (mixing unit) in a predetermined size ratio below the aggregate storage bins. Once the heated aggregate and dry fillers are added to the pugmill mixer, the asphalt is introduced and mixed with the aggregate. The lime slurry is added at the same time as the asphalt is introduced to the mix.

This asphalt mix material can then be discharged directly into the truck for transportation to site or into a small weighing and collecting hopper. Asphalt mix can be sent to a storage silo where the trucks can also be loaded.

In a batch plant operation, the batch sizes vary between 3 tons and 5 tons per batch. A fully loaded truck holds 18 to 20 tons of material and it takes a number of batch discharges to fill each transport truck up to legal loading capacity.

Batch plants have a lower production capacity than continuous production plants, but can be more flexible. The aggregate can be heated to, for example, from 220° F. to 320° F. depending on the mix, and sent to a number of overhead storage bins with each bin having a specific size range of aggregates stored in it. During a run of any given mix, the system can be reprogrammed to release a different aggregate mix, a few trucks can be loaded with this mix and sent to site and then the system can be reset to another mix type. This can be useful if there are two or three contracts going on at the same time, each requiring a different mix type.

To increase throughput, the heater can be heating the next batch while the previous is being mixed. Capacity can be on the order of tens of tons per hour. Batch heater plants are often used where short production runs are common (a different recipe can be used on each mix) or where total volume is low. Mobile batch heaters are also available.

Figure 4:
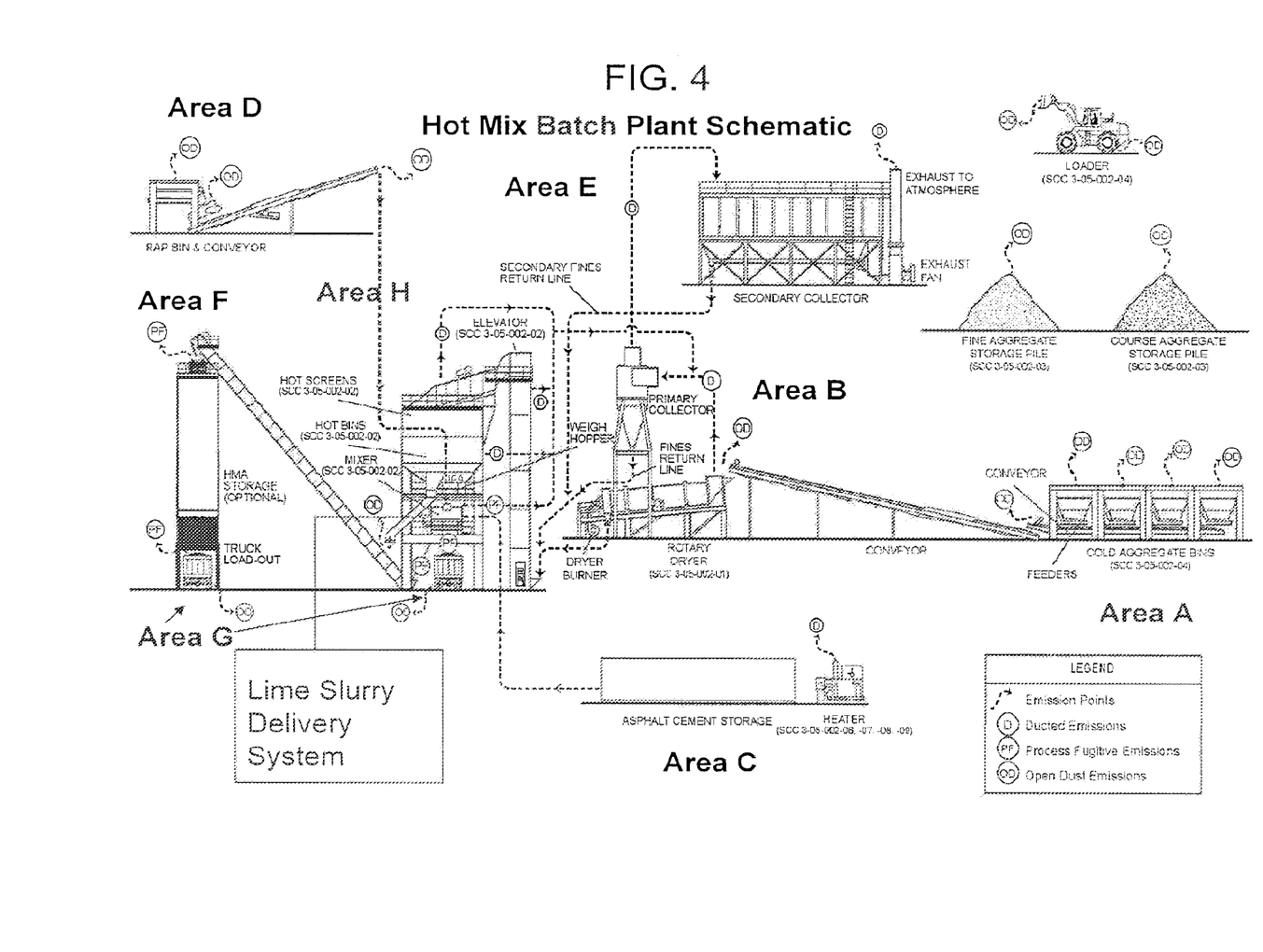
FIG. 4 shows a schematic of a batch production plant.

FIG. 4 depicts an example of the hydrated lime slurry asphalt additive added in a batch drum plant.

Area A is the aggregate bin storage area, each bin has a specific size aggregate stored in it. The conveyor belts below the bins are on load cells and the feeders from these bins are opened or closed to provide the mix of aggregate sizes required for each asphalt mix material produced.

Area B is where the blended aggregate enters the mixing drum. There is a burner on the drum which heats up the aggregate as it travels through the drum to temperatures in excess of 300° F. In various embodiments, the temperature can be equal to, and/or greater than, 210° F.

Area C is the asphalt storage area and material is pumped from here, forming an asphalt stream, into the pugmill (mixer) (Area J, discussed below). This is not a continuous operation.

In Area D, reclaimed asphalt pavement (RAP) is optionally introduced to the asphalt mix in the pugmill (Area J). Not all asphalt mixes contain RAP.

Area E includes a particulate matter collector. The burner in the heating drum produces hurricane force winds in the heating drum. This force can blow fine material out of the heating drum along with hot air. This fine material is collected in a filter house before the hot air is vented. This prevents particulate matter from being blown into the atmosphere.

Area F is the storage silo where the asphalt mix material is optionally stored while waiting for trucks to arrive and take the material to the worksite. A storage silo is optionally used on a batch plant setup.

Area G is the loading area for filling trucks before transportation to the worksite. Trucks can be filled directly from the pugmill after the aggregate and asphalt are mixed or filled from mixed material previously sent to the storage silo.

Area H is overhead storage of hot aggregate. The aggregate is heated up through the drum and then conveyed to the overhead storage areas. The heated aggregate passes over a number of screens and falls into a number of bins as a specific size fraction. From here, the sized, heated aggregate is released into the pugmill (Area J) in measured quantities.

Area J is the pugmill where the aggregate from the overhead storage bins is weighed into the mixer along with a measured quantity of asphalt. The mixer mixes the aggregate and asphalt for a specific time, for example, up to about 90 seconds, and from there the asphalt mix is sent to the storage silo or directly to the truck for transportation to the work site or site of the project.

Figure 5:
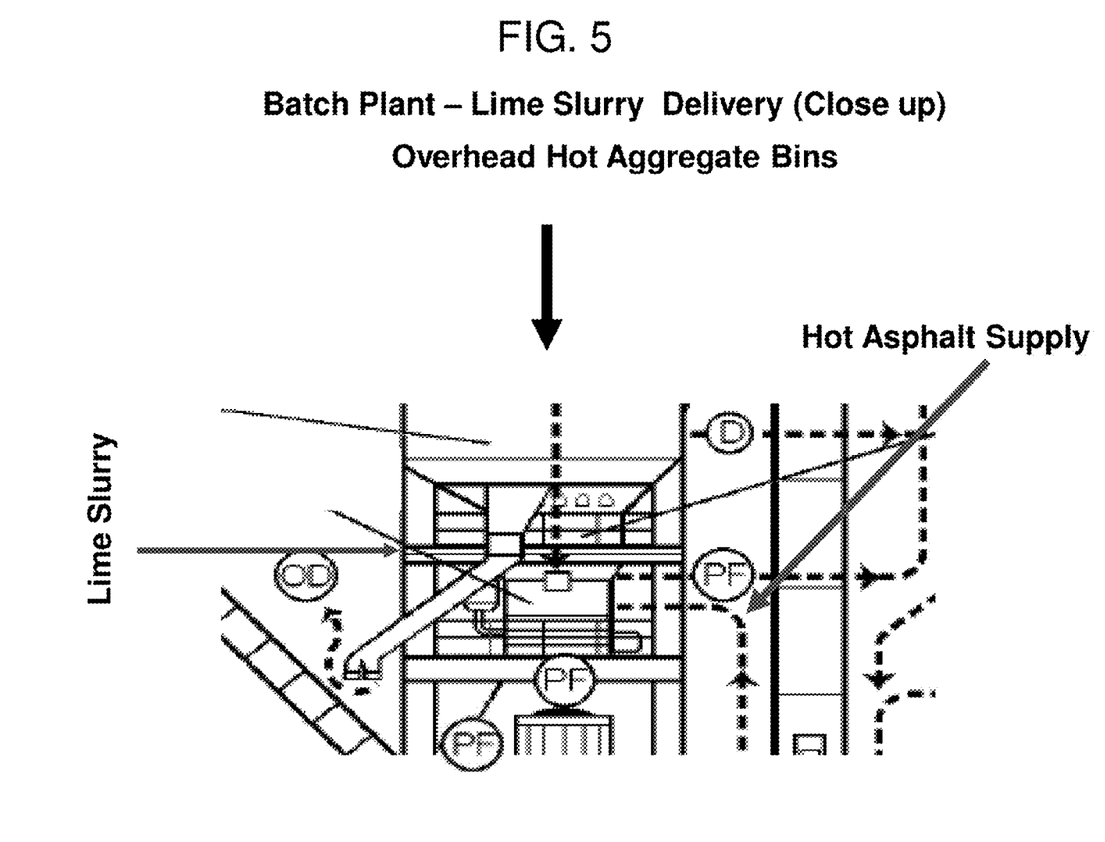
FIG. 5 shows an injection point of the hydrated lime slurry asphalt additive in batch plant operation.

As shown in FIG. 5, a close-up view of the process flow chart of FIG. 3, featuring the pugmill (mixer), the hydrated lime slurry asphalt additive is introduced into the pugmill in a measured quantity at the same time as the asphalt is discharged into the pugmill. The hydrated lime slurry asphalt additive is introduced at a rate of about 5% by weight of asphalt. The aggregate and asphalt are introduced into the pugmill at about the same time.

For Warm Mix Asphalt (WMA) the overhead aggregate bin is heated to a lower temperature (for example, 60° F. to 100° F. lower) than normal for Hot Mix Asphalt (HMA). The aggregate/asphalt and hydrated lime slurry asphalt additive are mixed in the pugmill for a set time, for example from 15 seconds to 45 seconds and then discharged to the truck for transport to the work site.

C. Production Temperature Ranges

Decreasing the manufacturing temperature of asphalt mix systems can lead to less energy use in asphalt production facilities.

Various embodiments of the WMA utilizing the hydrated lime slurry additive can be produced at a temperature in the range of greater than 200° F., 205° F., 210° F., 215° F., 220° F., 225° F., 230° F., 235° F., 240° F. 245° F., 250° F., 255° F., 260° F., 265° F., 270° F., 275° F., and/or less than 275° F., 270° F., 265° F., 260° F., 255° F., 250° F., 245° F., 240° F. 235° F., 230° F., 225° F. 220° F., 215° F., 210° F., 205° F., or 200° F.

In some embodiments, the warm mix compositions are produced by mixing from about between 2.0% wt. to about 10% wt. of the asphalt at a temperature in the range of between about 240° F. to 360° F., about 2% wt. to 8% wt. of hydrated lime slurry additive at a temperature range of between 50° F. to 100° F., and from about between 90% wt. to about 98% wt. aggregate at a temperature in the range of between about 260° F. to 360° F.

Production of Asphalt Pavement

In another aspect, the disclosure is directed to a method of making an asphalt pavement.

In some aspects, haul distances of truckloads of a lower temperature asphalt mix can be extended before the mix becomes to cool to use. The warm asphalt mix can be applied to surfaces in cooler temperatures than conventional hot asphalt mix while still meeting density requirements at the worksite. In certain aspects, the WMA with the hydrated lime slurry additive include better compaction (increased density) of the pavement by application equipment because of the lower number of air voids.

Lower temperatures on the worksite mean less worker exposure to asphalt fumes during the application process. Odors are also reduced.

A. Preparing a Warm Mix Asphalt Paving Composition

In various embodiments, a warm mix asphalt composition includes adding an asphalt stream into a mixer, adding a hydrated lime slurry into the asphalt stream, adding aggregate into the mixer and mixing the asphalt, hydrated lime slurry and aggregate in the mixer to form a warm mix asphalt composition.

B. Compacting the Warm Mix Asphalt Composition to Form an Asphalt Pavement

In certain aspects, asphalt concrete is a mixture including asphalt and aggregate, which has been compacted into a mass.

In some aspects, asphalt pavements are pavements including a surface course of asphalt concrete over supporting courses such as asphalt concrete bases, crushed stone, slag, gravel, Portland Cement Concrete (PCC), brick, or block pavement.

Warm mix asphalt can be transported to the worksite by trucks. In various embodiments, warm mix asphalt composition can be spread on a surface and compacted on said surface.

Optionally, the warm mix asphalt composition can be spread on and/or into a porous surface.

C. Compacting the Warm Mix Asphalt Composition to Pave a Surface

WMA is used for paving surfaces including roads, driveways, and parking lots, or for use as a paving composition for used in repair of these surfaces. For example, repairing damaged roads.

In various embodiments, a method of paving a surface includes preparing a WMA composition including the steps of adding an asphalt stream into a mixer, adding a hydrated lime slurry into the asphalt stream, adding aggregate into the mixer, mixing the asphalt, hydrated lime slurry and aggregate in the mixer to form a warm mix asphalt composition, spreading said warm mix asphalt composition on a surface, and compacting said warm mix asphalt composition to pave said surface.

Since the hydrated lime slurry additive is injected into the asphalt stream (in a continuous process) or into the mixing asphalt and aggregate (in a batch process), water is temporarily trapped in the adhesive mix system for better compaction and coating at lower temperatures.

Typical temperatures for pavement construction using HMA are about 180° F. to 320° F. Temperatures for pavement construction drop to about 150° F. to 260° F. when using the hydrated lime slurry additive.

In various embodiments, the WMA with the hydrated lime slurry additive is spread and compacted to pave a surface at a temperature of greater than 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F. and/or less than 260° F., 255° F., 250° F., 245° F., 240° F., 235° F., 230° F., 225° F., 220° F., 215° F., 210° F., 205° F., 200° F., 195° F., 190° F., 185° F., 180° F., 175° F., 170° F., 165° F., 160° F., 155° F. or 150° F.

Features and details of the disclosure can be more completely understood by reference to the following descriptions of detailed examples, taken in conjunction with the figures and from the appended claims.

EXAMPLE

The example described herein is intended only to illustrate aspects of the disclosure, and is not intended to limit or otherwise constrain the disclosure as described herein.

A set of asphalt mix compositions including a traditional hot mix asphalt (HMA), a warm mix asphalt (WMA) prepared with asphalt binder treated with hydrated lime slurry additive (Western Emulsions or ("WE mix")) and a warm mix asphalt (WMA) using an asphalt binder treated with an amine based anti-stripping agent, (Evotherm® DAT asphalt or ("EVOTHERM mix")), are prepared as samples and tested for performance characteristics as asphalt concrete. EVOTHERM® DAT asphalt is available from MeadWestvaco Corporation, Richmond, Va.

For comparison purposes, a control sample of asphalt mix (HMA) was produced using conventional hot mix asphalt conditions (300° F.). The warm mixes were produced at 250° F., i.e., fifty degrees lower than the traditional hot mix process.

The mix design was conducted at Russell Standard Corporation at Erie & Wheelertown, Pa. The aggregate is a blend of gravel and limestone (56% and 44%, respectively), with a 9.5 mm nominal size aggregates. Under the Design Equivalent Single Axel Loads (ESALs) of 300000 to 3000000, the compaction level was estimated to be 75 gyrations. Design ESAL is the number of equivalent 80-kN (18,000-lb.), single-axle load applications (equivalent single axle loads) expected throughout the design period.

A series of mixes with varying asphalt content (5.6, 6.1, 6.6, and 7.1% wt.) were prepared and plotted against percent air voids in each mix as part of the Superior Performing Asphalt Pavements ("Superpave") criteria to determine the optimum asphalt content. Air voids are the internal spaces in a compacted mix surrounded by asphalt-coated particles, expressed as a percentage by volume of the total compacted mix.

Superpave is an asphalt mixture design and analysis system developed from asphalt research by the Strategic Highway Research Program (SHRP). The Superpave system includes a performance-based asphalt binder specification, a mix design analysis system, test procedures and equipment.

The data show that in order to get the standard 4% air voids the optimum asphalt content of the mix was calculated to be 6.1%. The mix design gradation and optimum asphalt contents are shown in Table 1.

TABLE 1

Target Gradation and Asphalt Content.

| Sieve Size | | Gravel | Limestone | Trial blend | Specification | |
|---|---|---|---|---|---|---|
| Metric | Standard | % Passing | | | Min. | Max. |
| 19.0 | ¾ | 100.0 | 100.0 | | | |
| 12.5 | ½ | 100.0 | 100.0 | 100 | 100 | |
| 9.5 | ⅜ | 100.0 | 98.0 | 99 | 90 | 100 |
| 4.75 | #4 | 97.0 | 27.0 | 66 | | 89 |
| 2.36 | #8 | 76.0 | 2.0 | 43 | 32 | 67 |
| 1.18 | #16 | 48.0 | 1.0 | 27 | | |
| 0.600 | #30 | 31.0 | 0.9 | 18 | | |
| 0.300 | #50 | 14.0 | 0.9 | 8 | | |
| 0.150 | #100 | 10.0 | 0.9 | 6 | | |
| 0.075 | #200 | 6.5 | 0.9 | 4 | 2 | 10 |
| AC, % | | | | 6.1 | | |

The mix selected for use in the gyratory machine was placed in a heated mold and then subjected to the specified $N_{design}$=75 gyration number. In the compactor, the mix was compacted into a disk shape. The Bulk Specific Gravity, $G_{mb}$, of the disk was then determined. The remaining mixture was used in loose form to find the Maximum Theoretical Specific Gravity, $G_{mm}$. Using these two values along with the Aggregate Percentage By Weight, $P_s$, and the Combined Bulk Specific Gravity of the Aggregate Blend, $G_{sb}$, the volumetric properties of the mix, namely the Voids in Mineral Aggregate (VMA), Voids Filled with Asphalt (VFA), and Percent Air Voids were calculated.

Volumetric properties for each of the three mix design combinations are presented in Table 2. Each result represents the average of two samples. The asphalt content used for the warm mix study was kept at 6.1% wt. for comparison purposes with the control.

The asphalt was PG 64-22, available from Martin Asphalt Company, South Houston, Tex. The aggregate was a blend of 56% wt. TSG25B14 gravel, available from Troyer Sand & Gravel, Ltd., Waterford, Pa., and 44% wt. HGR14B14 Limestone, available from Glenn O. Hawbaker, Inc., Pleasant Gap, Pa.

The hydrated lime slurry additive, was prepared from hydrated lime and water with lime amount of 30% wt. The lime was dispersed in the water with a mixer. The total solids of the hydrated lime slurry was about 30%. The hydrated lime slurry was added to the asphalt mix in a percentage of about 5% wt. of the total asphalt cement. The laboratory blending procedure is similar to batch production in the field. The aggregate can be introduced in a mixing bowl, followed by the asphalt and then the lime slurry is placed on top of the asphalt and immediately mixed. Water is added to the lime or hydrated lime as a premix before adding to the asphalt.

TABLE 2

Volumetric Mix Design Data for the Trial Blend Aggregate

|  | Temp (° F.) | AC, % | $G_{mm}$ | % $G_{mm}$ @$N_i$ | $G_{mb}$ | Air Voids, % | VMA | VFA |
|---|---|---|---|---|---|---|---|---|
| Hot Mix Asphalt Control | 300 | 6.1 | 2.421 | 87.7 | 2.327 | 3.9 | 15.6 | 75.0 |
| EVOTHERM Mix | 250 | 6.1 | 2.401 | 88.8 | 2.349 | 2.2 | 14.8 | 85.4 |
| Western Emulsions Mix | 250 | 6.1 | 2.406 | 88.4 | 2.342 | 2.7 | 15.1 | 82.1 |

As shown in Table 2, the warm mixes exhibited substantially lower air voids content than the control (hot mix asphalt). This is an indication that the warm mixes were more compacted (denser) than the hot mix at the same number of 75 gyrations. This was a surprising finding for the engineers responsible for the mix design. If the warm mixes were compacted to the 4% air voids as its hot mix counterpart, the estimated asphalt content for each warm mix blend as well as their volumetric parameters would be the following (Table 3)

TABLE 3

Estimated Optimum Asphalt for the Warm Mixes

| Estimated % | Evotherm Mix | Western Emulsions Mix | Specification |
|---|---|---|---|
| AC @ 4% Voids | 5.4 | 5.6 | 4.0% |
| % Air Voids @ $N_{ini}$ | 13.1 | 13.0 | >9.5 |
| % VMA @ AC | 14.6 | 15.0 | 15 Min. |
| % VFA @ AC | 72.6 | 73.3 | 65-78 |

As shown in Table 3, the two warm mix additives can have a potential effect in reducing the design asphalt content of the hot mix. Evotherm mix reduced the design asphalt content by 0.7 percent, while Western Emulsions Mix reduced the design asphalt content by 0.5 percent.

The warm mixes are more compacted (denser) than the hot mix at the same number of 75 gyrations and exhibited substantially lower air voids content than the control hot mix sample. This is a surprising finding for the engineers responsible for the mix design. The warm mixes are easier to compact than the hot mix sample. If the warm mixes are compacted to the 4% air voids as prescribed by the Superpave guidelines, the Western Emulsions mix has less effort to compaction (smaller number of gyrations) and has the potential to reduce the optimal asphalt content by about 0.5 percent. This would translate in important savings in asphalt along with a substantial reduction in process temperature.

A method, AASHTO T-283 was used to evaluate moisture-induced damage and effectiveness of additives, such as hydrated lime and liquid anti-stripping chemicals, in compacted hot mix asphalt. This method covers preparation of specimens and the measurement of the change of diametral tensile strength resulting from the effects of water saturation and accelerated water conditioning, with a freeze-thaw cycle, of compacted hot mix asphalt (HMA). The results may be used to predict long-term stripping susceptibility of the HMA and evaluate liquid anti-stripping additives that are added to the asphalt binder or pulverulent solids, such as hydrated lime or Portland cement, which are added to the mineral aggregate.

Test specimens for each set of mix blends and conditions, such as a traditional hot mix asphalt (HMA), a warm mix asphalt prepared with asphalt binder treated with hydrated lime slurry additive (Western Emulsions or (WE)) and a warm mix asphalt binder treated with an amine based anti-stripping agent (Evotherm® DAT asphalt or (EVOTHERM)) are prepared. Each set of specimens is divided into subsets. One subset is tested in dry condition for indirect-tensile strength. The other subset is subjected to vacuum saturation and a freeze cycle, followed by a warm-water soaking cycle, before being tested for indirect-tensile strength. Numerical indices of retained indirect-tensile strength properties are calculated from the test data obtained by the two subsets: dry and conditioned. The conditioned subset is also referred to as the "wet" subset. See American Association of State Highway and Transportation Officials, Standard Method of Test for Resistance of Compacted Hot Mix Asphalt (HMA) to Moisture-Induced Damage, AASHTO Designation: T283-07 (2008). The method of which is incorporated herein by reference.

TABLE 4

Results of ITS and TSR Testing

|  | EVOTHERM Mix | Western Emulsions Mix | Hot Mix Asphalt (Control) |
|---|---|---|---|
| Conditioned (wet) ITS (kPa) | 597.8 | 652.5 | 711.4 |
| Dry ITS (kPa) | 634.3 | 660.4 | 748.8 |
| TSR (%) | 94.3 | 98.8 | 95.0 |

As shown in table 4, the tensile strength ratio (TSR), which is a measure of a mixture's resistance to moisture damage, was also reported. The minimum TSR value for most of the Department of Transportation (DOT) specifications is 80%. The results of the mixtures indicated that each mix exceeded the minimum requirements for TSR. The conditioned and dry Indirect Tensile Strength (ITS) of Western Emulsions mix was higher than the competitor, EVOTHERM mix.

Figure 1:
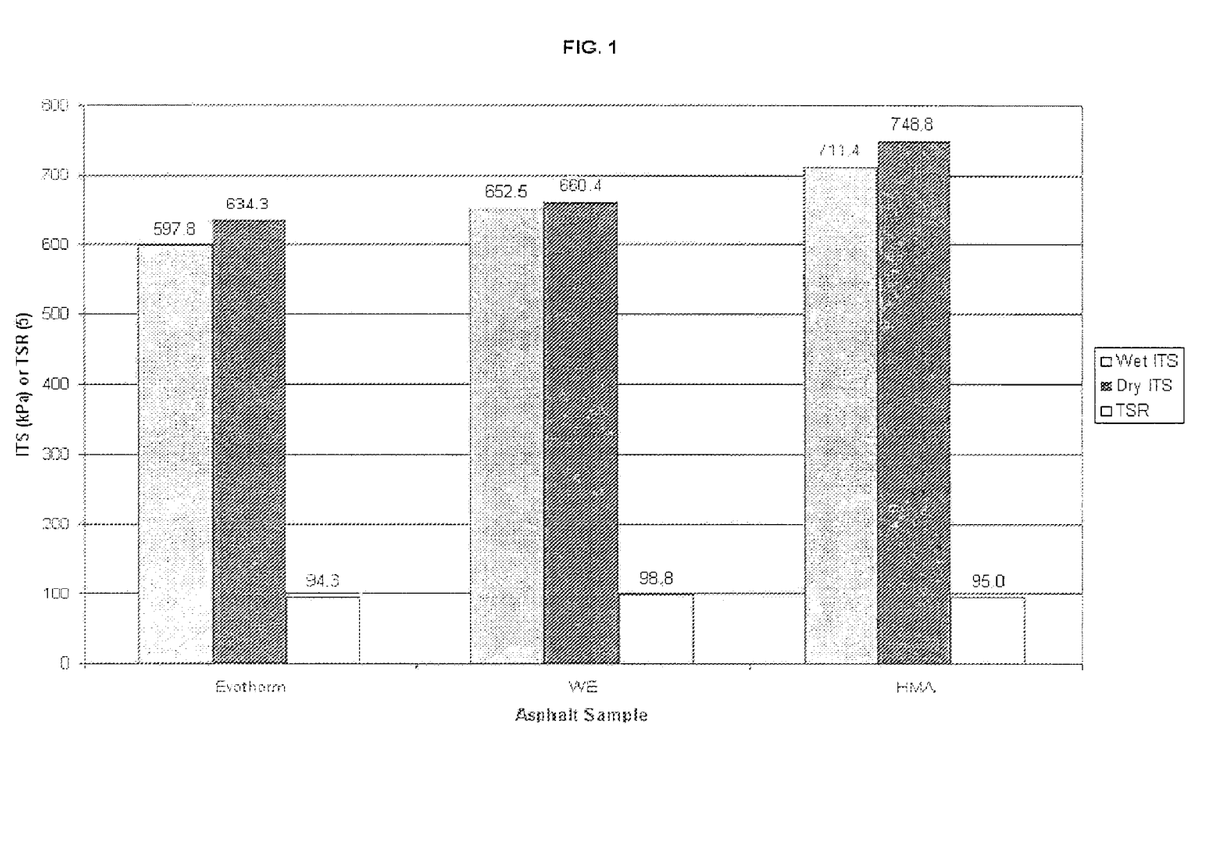
FIG. 1 shows the test results of Table 4 in chart form.

Results of indirect tensile strength (ITS) testing are also illustrated in chart form in FIG. 1. The tensile strength ratio (TSR), which is a measure of a mixture's resistance to moisture damage, is also included in this figure.

All references disclosed herein, whether patent or non-patent, are hereby incorporated by reference as if each was included at its citation, in its entirety.

Although the present disclosure has been described with a certain degree of particularity, it is understood the disclosure has been made by way of example, and changes in detail or structure may be made without departing from the spirit of the disclosure as defined in the appended claims.

The invention claimed is:

1. A method of making a warm mix asphalt composition comprising the steps of:
   A) adding an asphalt stream into a mixer;
   B) adding a hydrated lime slurry comprising between about 15% wt. to 40% wt. lime into the asphalt stream in an amount of about 5% wt. by total weight of asphalt;
   C) adding aggregate into the mixer; and
   D) mixing said asphalt, hydrated lime slurry and aggregate in the mixer to form a warm mix asphalt composition.

2. A method of making a warm mix asphalt composition comprising the steps of:
   A) adding an asphalt stream into a mixer at an elevated temperature;
   B) adding a hydrated lime slurry comprising between about 15% wt. to 40% wt. lime into the asphalt stream at an elevated temperature in an amount of about 5% wt. by total weight of asphalt;
   C) adding aggregate into the mixer at an elevated temperature; and
   D) mixing said asphalt, hydrated lime slurry and aggregate in the mixer to form a warm mix asphalt composition.

3. The method of making a warm mix asphalt composition according to claim 2, wherein said mixer is in a continuous process plant.

4. A method of making a warm mix asphalt composition comprising the steps of:
   A) adding an asphalt stream into a mixer at a batch processing plant at an elevated temperature;
   B) adding aggregate into the mixer;
   C) adding a hydrated lime slurry comprising between about 15% wt. to 40% wt. lime in an amount of about 5% wt. by total weight of asphalt;
   D) mixing said asphalt, aggregate and hydrated lime slurry in the mixer to form a warm mix asphalt composition.

5. A method of making an asphalt pavement comprising the steps of:
   A) adding an asphalt stream into a mixer;
   B) adding a hydrated lime slurry comprising between about 15% wt. to 40% wt. lime into the asphalt stream in an amount of about 5% wt. by total weight of asphalt;
   C) adding aggregate into the mixer;
   D) mixing said asphalt, hydrated lime slurry and aggregate in the mixer to form a warm mix asphalt composition;
   E) spreading said warm mix asphalt composition on a surface; and
   F) compacting said warm mix asphalt composition to form an asphalt pavement on said surface.

6. A method of paving a surface comprising the steps of:
   A) adding an asphalt stream into a mixer;
   B) adding a hydrated lime slurry comprising between about 15% wt. to 40% wt. lime into the asphalt stream in an amount of about 5% wt. by total weight of asphalt;
   C) adding aggregate into the mixer;
   D) mixing said asphalt, hydrated lime slurry and aggregate in the mixer to form a warm mix asphalt composition;
   E) spreading said warm mix asphalt composition on a surface; and
   F) compacting said warm mix asphalt composition to pave said surface.

* * * * *